United States Patent
Huston et al.

[11] Patent Number: 5,574,286
[45] Date of Patent: Nov. 12, 1996

[54] SOLAR-BLIND RADIATION DETECTOR

[76] Inventors: Alan L. Huston, 8501 Fairburn Dr.;
Brian L. Justus, 6609 Holford La.,
both of Springfield, Va. 22152

[21] Appl. No.: 497,660

[22] Filed: Jun. 30, 1995

[51] Int. Cl.⁶ ............................................. G01J 3/51
[52] U.S. Cl. .......................................... 250/372
[58] Field of Search ................................. 250/372

[56] References Cited

U.S. PATENT DOCUMENTS

| | | | |
|---|---|---|---|
| 4,597,629 | 7/1986 | Kraushaar et al. | 359/358 |
| 4,731,881 | 3/1988 | Geller | 455/619 |
| 5,021,668 | 6/1991 | Talmore et al. | 250/372 |
| 5,196,705 | 3/1993 | Ryan | 250/372 |
| 5,331,168 | 7/1994 | Beaubien et al. | 250/372 |
| 5,468,963 | 11/1995 | Bishop | 250/372 |

*Primary Examiner*—Carolyn E. Fields

[57] ABSTRACT

An apparatus for detecting a UV signal in the presence of background solar radiation comprises: a first filter system disposed along an optical axis being responsive to a light flux containing background solar radiation and a UV signal for passing UV light wavelengths below a selected UV wavelength and having a very sharp wavelength cutoff to substantially block wavelengths within a first selected wavelength band above the first selected UV wavelength; second and third filter systems serially disposed along the optical axis and tilted off the optical axis with respect to each other are selectively responsive to light from the first filter system for sequentially passing UV light wavelengths below the selected UV wavelength and substantially blocking visible light within the first selected wavelength band; a downconverter transforms the UV signal light from the third filter system to visible light in a second selected wavelength band; a dielectric coating disposed adjacent to the downconverter and between the third filter system and the downconverter for passing the UV signal light into the downconverter and for reflecting the visible light produced by the downconverter; a fourth filter system responsive to light from the downconverter for blocking all wavelengths greater than 700 nm that may have passed through the first, second and third filter systems and for passing therethrough the visible light in the second selected wavelength band; and a photomultiplier tube for detecting the visible light in the second selected wavelength band.

23 Claims, 6 Drawing Sheets

SOLAR-BLIND RADIATION DETECTOR

BACKGROUND OF THE INVENTION

1. Field of the Invention

The present invention relates to radiation detectors and particularly to a solarblind radiation detector that responds only to ultraviolet light at wavelengths below about 285 nanometers in the presence of solar illumination.

2. Description of the Related Art

The detection of ultraviolet (UV) light during daylight conditions is an important problem for both commercial and military applications. It is difficult to design a very sensitive detector that can be used in broad daylight to detect very low levels of UV radiation. The spectral distribution of radiation from the sun is similar to that of a 6,000 degree black-body radiator. The solar spectral distribution drops off very sharply below 290 nm due to atmospheric absorption by ozone. As a result, the earth's surface is essentially dark below 290 nm. A solar-blind detector can be defined as a device or apparatus that only responds to light wavelengths below about 285 nm.

Applications for solar-blind detectors include monitoring lightning events during thunderstorms, detecting ultraviolet laser sources such as excimer lasers or frequency quadrupled Nd:YAG lasers used as LIDAR sources, and ultraviolet telescope detectors for space platforms.

Many prior art approaches have been proposed to achieve solar blind detector performance.

One approach, described in U.S. Pat. No. 4,731,881, uses a series of chemical and color glass filters to accomplish UV transmission below 285 nm and a sharp cut off, blocking wavelengths longer than 285 nm. The chemical filters consist of an expensive, single crystal nickel sulfate hexahydrate crystal that has very poor thermal and moisture stability, and an organic dye, Cation X, contained in a polyvinylalcohol film to provide UV bandpass characteristics. This approach uses a relatively expensive UV sensitive photomultiplier tube for detection.

Another approach (described in U.S. Pat. No. 4,731,881) uses a ruby crystal with interference filters coated on the two faces. The input face has a bandpass interference filter that transmits a narrow UV band at approximately 254 nm and rejects all other wavelengths. The output face of the ruby crystal is coated with an interference filter that transmits the ruby fluorescence wavelengths and blocks all other wavelengths. The performance of this device is limited by the band pass and broad band blocking capability of interference filters. A dielectric coating is limited to a rejection of about $10^5$ outside of the bandpass region. An out-of-pass-band rejection of approximately $10^{18}$ is necessary for true solar blind detection.

Other approaches (described in U.S. Pat. Nos. 4,241,258 and 5,331,168) use UV sensitive phosphor powders as downconverters. Phosphor powders are highly scattering and can result in reduced light collection efficiency.

Such prior art approaches suffer from either excessively low transmission in the UV signal wavelength region or inadequate rejection of visible light.

SUMMARY OF THE INVENTION

It is therefore an object of the invention to provide an improved solar blind radiation detector.

Another object of the invention is to provide a solar-blind radiation detector apparatus that detects ultraviolet light at wavelengths below 290 nm in the presence of solar illumination.

A further object of this invention is to provide an apparatus which utilizes a combination of band-pass and band-reject filters, in conjunction with an ultraviolet absorbing, frequency downconverter and a visible-light-sensitive photomultiplier tube to detect ultraviolet signals at wavelengths below about 285 nm in the presence of solar illumination.

These and other objects of this invention are achieved by providing a solar-blind radiation detector apparatus for detecting a UV signal in the presence of background solar radiation. The apparatus comprises: a first filter system disposed along an optical axis being responsive to a light flux containing background solar radiation and a UV signal for passing UV light wavelengths below a selected UV wavelength and having a very sharp wavelength cutoff to substantially block wavelengths within a first selected wavelength band above the first selected UV wavelength; second and third filter systems serially disposed along the optical axis and tilted off the optical axis with respect to each other are selectively responsive to light from the first filter system for sequentially passing UV light wavelengths below the selected UV wavelength and substantially blocking visible light within the first selected wavelength band; a downconverter transforms the UV signal light from the third filter system to visible light in a second selected wavelength band; a dielectric coating disposed adjacent to the downconverter and between the third filter system and the downconverter for passing the UV signal light into the downconverter and for reflecting the visible light produced by the downconverter; a fourth filter system responsive to light from the downconverter for blocking all wavelengths greater than 700 nm that may have passed through the first, second and third filter systems and for passing therethrough the visible light in the second selected wavelength band; and a photomultiplier tube for detecting the visible light in the second selected wavelength band.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENTS

Figure 1:
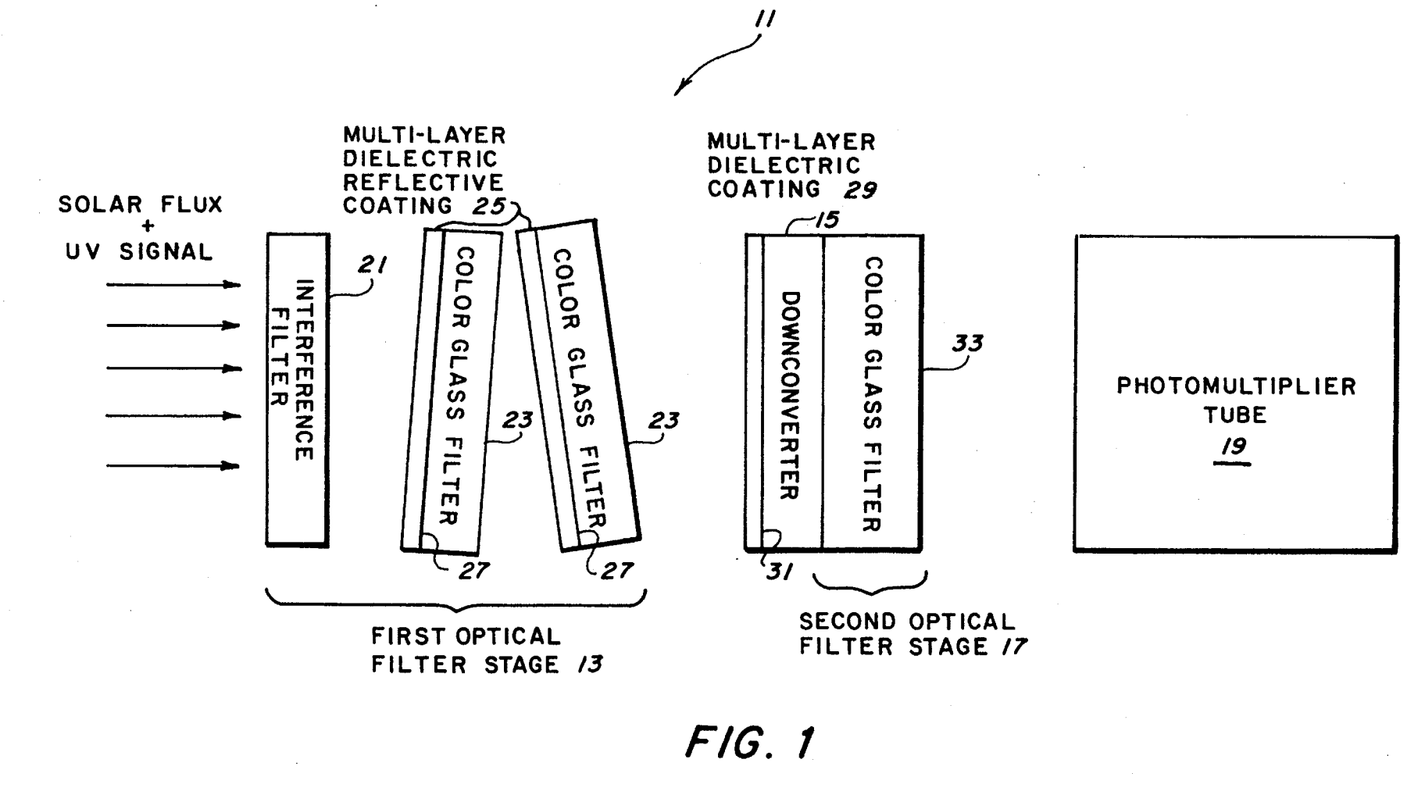
FIG. 1 illustrates a schematic diagram of a preferred embodiment of the solar-blind radiation detector of the invention.

Referring now to the drawings, FIG. 1 illustrates a schematic diagram of a preferred embodiment of the solar-blind radiation detector of the invention.

As shown in FIG. 1, the solar-blind radiation detector apparatus 11 of the invention comprises a first optical filter stage 13, an optical frequency downconverter 15, a second optical filter stage 17 and a photomultiplier tube 19. The first optical filter stage 13 is designed to pass ultraviolet wavelengths below about 285 nanometers (nm) and block wavelengths between about 285 nm and about 700 nm. The first filter stage 13 may also pass wavelengths longer than about 700 nm. The second optical filter stage 17 is designed to transmit wavelengths between about 400 nm and about 650 nm and block wavelengths below 400 nm and longer than 650 nm. The optical frequency downconverter 15 is placed between the first and second optical filter stages 13 and 17. The optical frequency downconverter 15 is an optically transparent, semiconductor and metal-doped phosphor glass or luminescent glass.

It should be noted at this time that the optically transparent phosphor glass or luminescent glass includes nanocrystalline semiconductor particles, such as ZnS nanocrystals, and an activator, such as copper, for the particles. The glass is made by depositing the nanocrystalline semiconductor particles and the activator within a porous glass matrix, such as 7930 Vycor™ and then thermally activating the glass. The porous glass matrix may be at least partially consolidated or may be allowed to remain porius. The nanometer particle size permits the luminescent glass to be transparent to its luminescent emissions. This above-described, optically transparent, phosphor glass is prepared by the procedure described from page 16, line 25 to page 18, line 14 of U.S. patent application Ser. No. 08/371,306, entitled GLASS MATRIX DOPED WITH ACTIVATED LUMINESCENT NANOCRYSTALLINE PARTICLES, filed on Jan. 11, 1995 by the present inventors, Huston and Justus. The entirety of U.S. patent application Ser. No. 08/371,306 is incorporated by reference herein for all purposes.

The function of the downconverter 15 is to absorb ultraviolet light of wavelengths below about 285 nm and transform the UV light to visible light between 400 nm and 650 nm. The downconverted visible light passes through the second filter stage 17 and is detected by the photomultiplier tube 19. The only light that can possibly reach the photomultiplier tube 19 is the downconverted visible light that originates from the frequency downconverter 15. Virtually no solar radiation photons can pass through the solar-blind radiation detector apparatus 11.

Before the operation of the solar-blind radiation detector apparatus 11 of FIG. 1 is explained more fully, the structural elements of the solar-blind radiation detector apparatus 11 shown in FIG. 1 will now be discussed.

The first optical filter stage 13 is comprised of at least one dielectric coated interference filter 21, at least one color glass filter 23 and a multi-layer dielectric reflective coating deposited on a surface 27 of an associated color glass filter 23. Each dielectric coated interference filter 21 was custom designed by the Corion Corporation (73 Jeffrey Avenue, Holliston Mass. 01746) to have a have a high transmission at wavelengths between 250 nm to 285 nm and a very sharp wavelength cutoff of less than 0.5% transmission to almost completely block wavelengths between 285 nm and 350 nm.

Each color glass filter 23 was designed to pass ultraviolet light efficiently and completely block visible light between 420 and 650 nm. Filters that provide this function include HOYA U330 and HOYA UH330, (manufactured by HOYA Corporation USA, 960 Rincon Circle, San Jose, Calif. 95 131) or Schott UG5 (manufactured by Schott Glass Technologies, 400 York Avenue, Duryea, Pa 18642) color glass filters. It should be understood that one or more filters 23 could be utilized in the detector 11 of FIG. 1 to perform the indicated function for the color glass filter 23.

Each multi-layer dielectric reflective coating 25 is designed to reflect wavelengths between 340 nm and 380 nm with better than 99% reflectivity, and transmit ultraviolet light wavelengths below about 285 nm. A coating providing this function is available from CVI Laser Corporation, 200 Dorado Place, S.E.P.O. Box 11308, Albuquerque, N.M. 87192.

A multi-layer dielectric coating 29 is deposited on an input surface 31 of the semiconductor-doped phosphor glass downconverter 15 to pass or transmit UV light and reflect visible light.

The downconverter 15 is an ultraviolet light-absorbing, frequency downconverter which is designed to absorb UV light at wavelengths less than about 275 nm and transform that UV light to visible light in a wavelength band between 450 nm and 650 nm. The phosphor glass downconverter 15 is transparent to the light in the wavelength band between 450 nm and 650 nm.

The second optical filter stage 17 comprises one or more color glass filters 33 designed to block all wavelengths greater than 700 nm. Filters that provide this function include the HOYA CM500 color glass filter (of the HOYA Corporation) or the Schott S8023 color glass filter (of Schott Glass Technologies).

The photomultiplier tube 19 is a visible-light-sensitive photomultiplier tube that detects visible light in the wavelength band between 450 nm and 650 nm.

Figure 2:
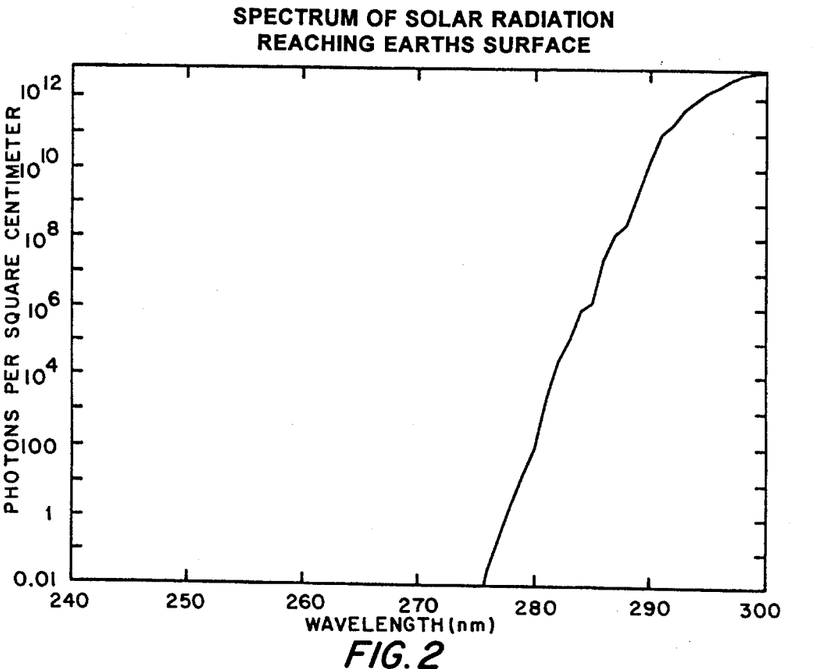
FIG. 2 is a plot showing the number of photons reaching the earth surface, per square centimeter per second as a function of wavelength.

In the operation of the solar-blind radiation detector apparatus 11 of FIG. 1, light or solar flux consisting of background solar radiation plus a UV signal is incident upon the interference filter 21 at the input of the detector apparatus 11 of the invention. The solar flux, as shown in FIG. 2, is the spectrum of the solar radiation that actually reaches the earth's surface as a function of wavelength in terms of the number of photons per square centimeter per second. The spectrum in FIG. 2 shows that the number of photons reaching the earth's surface cuts off very sharply at wavelengths below 285 nm, and that at a wavelength of about 275 nm there is less than 0.01 of a photon per square centimeter per second actually reaching the earth's surface. Thus, since the solar radiation striking the earth's surface drops off so sharply below 285 nm, very little solar radiation is available to be detected. As a result, the present invention is able to detect UV light that occurs at wavelengths below 285 nm from earthly events that generate UV photons, such as fires, lightning during thunderstorms, UV laser sources or any other event that generates UV light under daylight (as well as night-time) conditions.

In response to the incident solar flux plus the UV signal, the interference filter 21 passes light wavelengths below 285 nm and completely blocks wavelengths between 285 nm and 350 nm. A plurality of these interference filters 21 can be placed in series to form a stack that provides a required wavelength cutoff or the required wavelength blocking, if necessary, to enable the solar-blind radiation detector apparatus 11 to operate as desired. The number of interference filters 21 used in the stack depends on the required light extinction in the band between 285 nm and 350 nm. Each filter 21 transmits less than 0.5% over this range so that a stack of four interference filters 21 has a transmission of less than $10^{-10}$.

Figure 3:
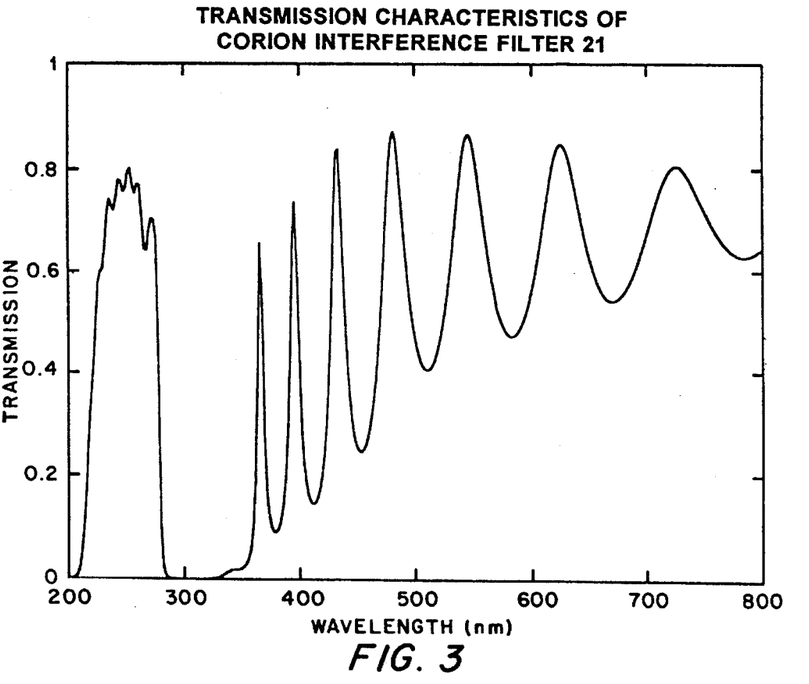
FIG. 3 shows the transmission characteristics of the interference filter of FIG. 1.

As shown in FIG. 3, the interference filter 21 does have a very sharp cutoff but the breadth over which it cuts off is limited to the wavelength range between 285 nm and about 350 nm. However, all of the visible light above about 350 nm must also be cut out or eliminated. Note that the interference filter 21 has a characteristic oscillation in the transmission of the interference filter 21 at visible wavelengths above about 350 nm. As a result, other filters must be utilized to effectively block these oscillations above about 350 nm.

Figure 4:
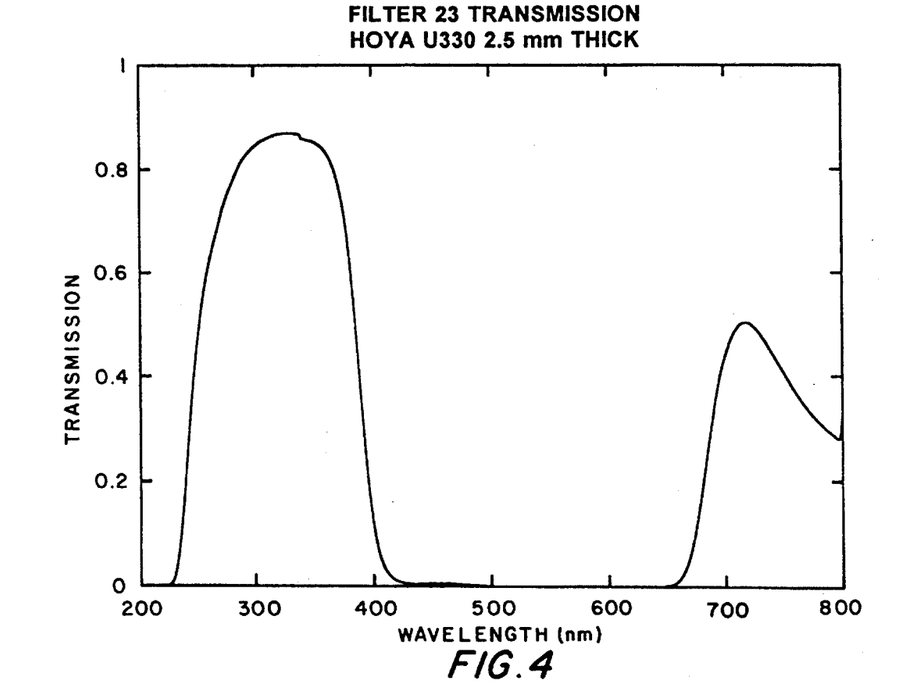
FIG. 4 shows the transmission characteristics of one of the HOYA U330 color glass filters of FIG. 1.

The color glass filter 23 of FIG. 1, which as discussed before can be an exemplary HOYA U330 or a Schott UG5 color glass filter, is disposed between the final interference filter 21 and the multi-layer dielectric coating 29 to transmit UV wavelengths therethrough and to absorb visible wavelengths between 420 nm and 650 nm. A plot of the transmission characteristics of a HOYA U330 color glass filter 23 of FIG. 1 is shown in FIG. 4. This plot of the HOYA U330 color glass filter 23 is very similar to the plot of the Schott UG5 color glass filter (not shown).

Figure 5:
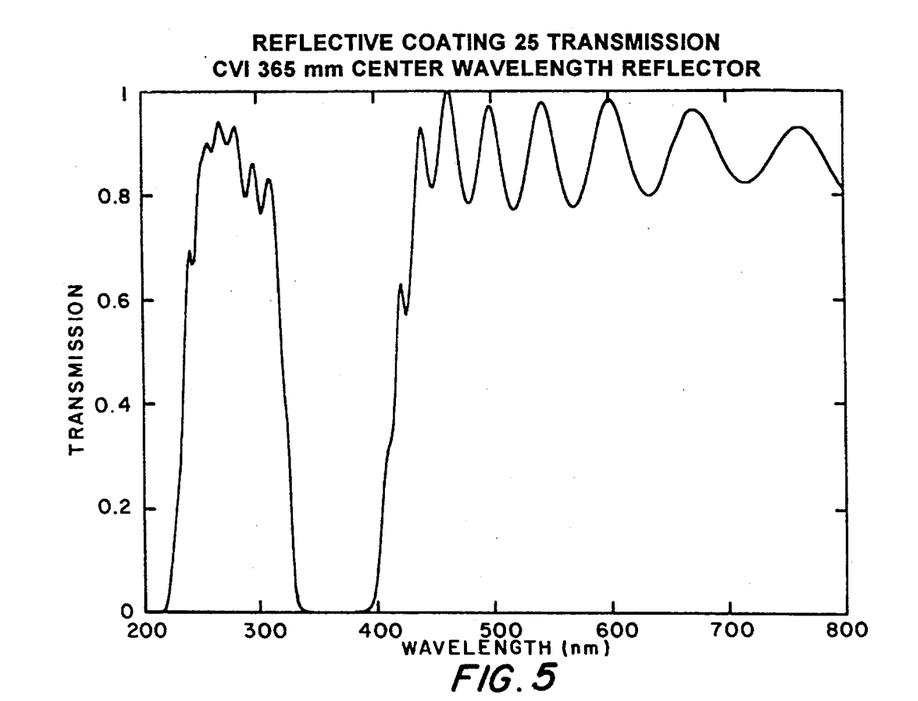
FIG. 5 shows the transmission characteristics of one of the dielectric reflective coatings of FIG. 1.

As can be seen in FIG. 4, the combination of the interference filter 21 and the color glass filter 23 is still not sufficient to completely block the principal wavelengths of the solar flux that is irradiating the detector 11. So another element, the multi-layer dielectric reflective coating 25, must be utilized. As stated before, the multi-layer dielectric reflective coating 25 is deposited on the surface of its associated color glass filter 23 and operates to transmit UV light wavelengths below 285 nm and to reflect visible light wavelengths between 320 nm and 380 nm. This operation of the multi-layer dielectric reflective coating 25 is illustrated in FIG. 5, which specifically shows the transmission characteristics of one of the dielectric reflective coatings 25 of FIG. 1.

In order to obtain the desired extinction of visible light wavelengths between 320 nm and 380 nm, several color glass filter 23 and reflective coating 25 combinations can be placed in series, as required, as shown in FIG. 1.

When two or more color glass filters 23 (and their respective associated reflective coatings 25) are placed in series, it is important that each adjacent pair of filters 23 not be parallel to each other but be tilted off-axis with respect to each other by an exemplary angle in an exemplary range from about 1 degree to about 10 degrees to prevent an etalon effect that might allow visible light wavelengths in the range between about 320 nm and about 380 nm to pass directly through a color glass filter 23.

An etalon effect would allow a band of visible light in the 320–380 nm range to pass through adjacent parallel filters 23 if the reflective coatings 25 were in parallel with each other. The tilting off-axis of the filters 23 (and their associated reflective coatings 25) allows the reflected visible light to reflect off of the adjacent coatings 25 and off the sides of the adjacent reflective coatings 25 (downward as shown in FIG. 1) where it will be absorbed by an absorbant material (not shown) in an outside container (not shown). Thus, the visible light in the 320–380 nm range would be reflected out of the detector 11 and not be allowed to be transmitted to the photomultiplier tube 19.

Figure 6:
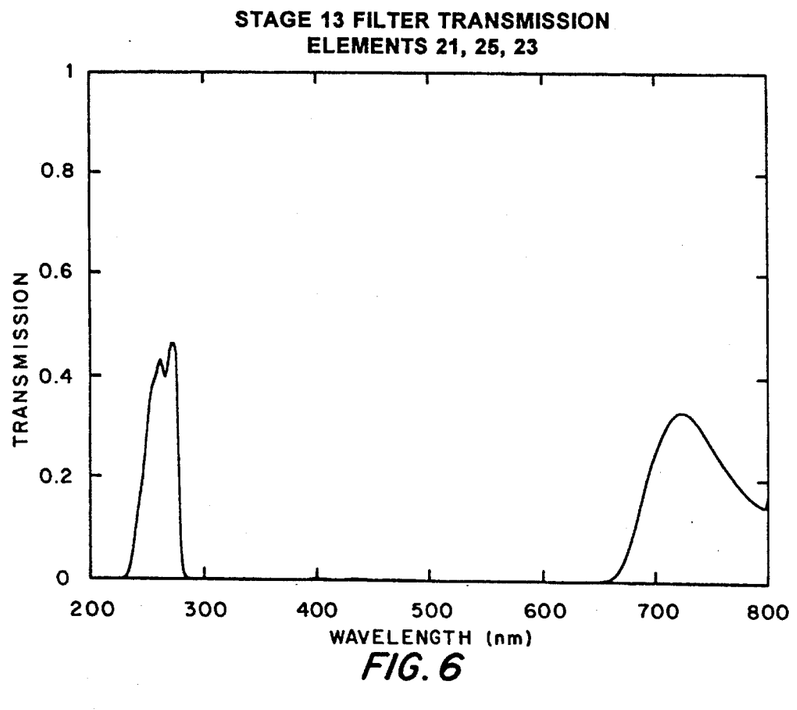
FIG. 6 shows the transmission of light through a serially-aligned arrangement of an interference filter, a HOYA U330 color glass filter and an associated dielectric reflective coating.

FIG. 6 is a plot showing the very good transmission for UV light wavelengths between 285 nm and about 240 nm and the very good light extinction between about 285 nm and about 650 nm, using a serially-aligned arrangement of only one interference filter 21, only one HOYA U330 color glass filter 23 and only one associated dielectric reflective coating 25. The performance of the filters 21, 23 and 25 can be significantly improved by using stacks of each of the filter elements 21, 23 and 25 to transmit the UV wavelength light and to block the visible wavelength light. For example, stacks of four of each of the filter elements 21, 23 and 25 could be used. Such stacks would tremendously reduce the amount of visible light that would be passed out of the final color glass filter 23 in the first optical filter stage 13.

It should be noted at this time that, although the multilayer dielectric reflective coating 25 is shown as a layer on its associated color glass filter 23 to save weight and space, the reflective coating 25 could be a separate piece of glass spaced apart from its associated color glass filter 23.

Light from the final color glass filter 23 in the first optical filter stage 13 is transmitted to the multi-layer dielectric coating 29 which is deposited on the input surface 31 of the phosphor glass downconverter 15. The dielectric coating 29 performs two functions. Its first function is to prevent any visible light that leaks through the interference filter 21, the dielectric reflective coating 25 and its associated color glass filer 23 from passing therethrough to the downconverter 15 and the remaining components in the detector 11. Its second function is to reflect light that is downconverted to visible light by the downconverter 15 toward the photomultiplier tube 19. This is possible because of the transparency of the phosphor glass downconverter 15. This operation increases the collection efficiency of the downconverted visible light by at least a factor of 2 over what the detector 11 would have if the reflective coating 29 were not utilized.

Light from the multi-layer dielectric coating 29, which is substantially UV light, is passed to the UV light-absorbing, frequency downconverter 15. Such a UV frequency downconverter is well known in the art and typically contain a standard phosphor, such as sodium salicylate or Sylvannia 2283 (trademark) phosphor, which absorbs UV light and re-emits visible light. The downconverter 15 absorbs ultraviolet light at wavelengths less than 275 nm and transforms that absorbed light to visible light in a wavelength band between 450 nm and 650 nm.

The downconverted visible light from the downconverter 15 is transmitted to a color glass filter 33 which comprises the second optical filter stage 17. The color glass filter 33 is designed to block all wavelengths greater than 700 nm that may pass through the interference filter 21, the multi-layer dielectric reflective coating 25 and its associated color glass filter 23. As mentioned before, filters that provide this function include the HOYA CM500 and the Schott S8023 color glass filters.

Figure 7:
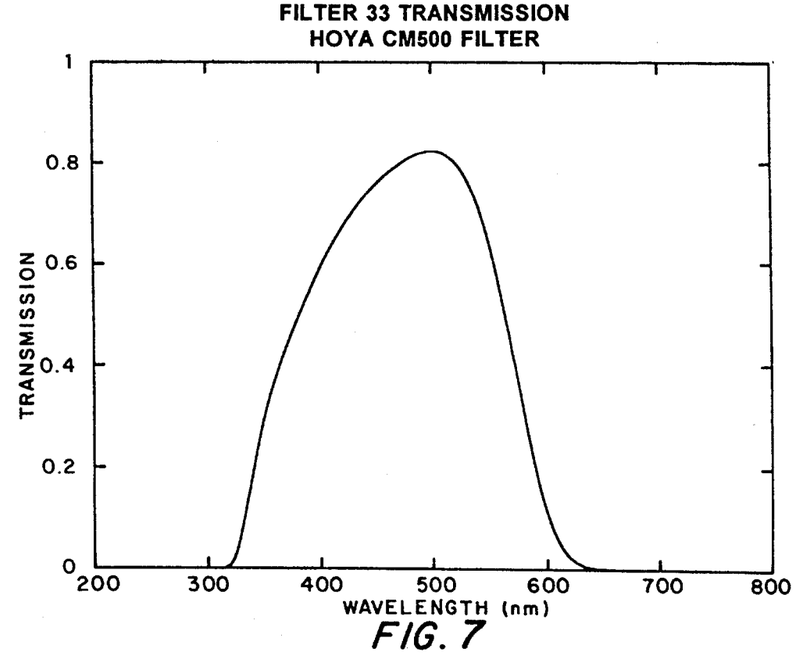
FIG. 7 shows the transmission characteristics of the HOYA CM500 color glass filter of FIG. 1.

FIG. 7 shows the transmission characteristics of the HOYA CM500 color glass filter 33 of FIG. 1. It can be readily seen that the filter 33 very effectively blocks wavelengths above 650 nm and UV wavelengths below about 320 nm. Thus, even the UV light that is incident on the detector 11 cannot pass all the way through the detector 11. Only the downconverted visible light can pass through the remaining components in the detector 11 to the photomultiplier tube 19.

Downconverted light from the color glass filter 33 is applied to the visible-light-sensitive photomultiplier tube 19, which detects the light generated by the frequency downconverter 15 to indicate that a UV signal has been detected. Such a photomultiplier tube 19 is well known in the art and, hence, requires no further description.

Figure 8:
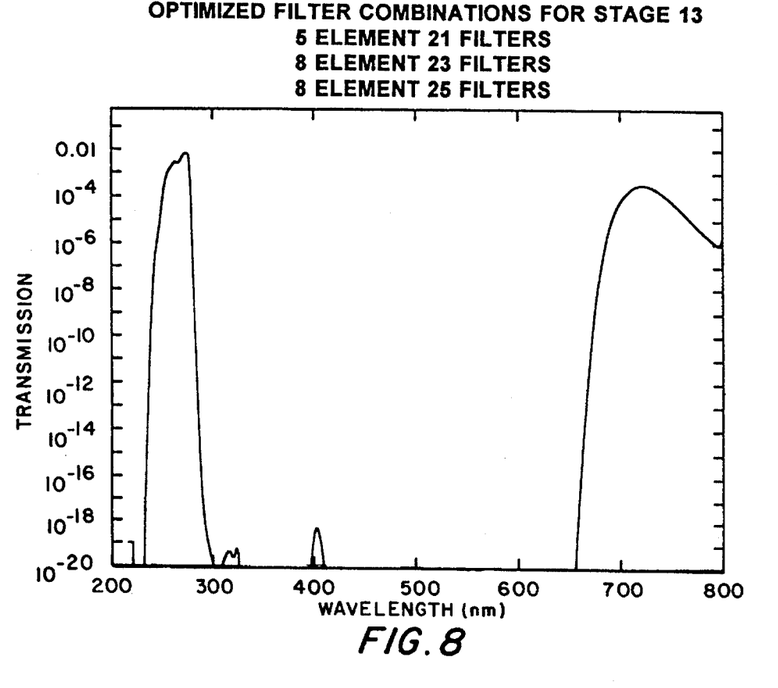
FIG. 8 shows the optimized transmission of Stage 1, required for "TRUE" solar blind operation, using a plurality of each of the interference filters, the HOYA U330 color glass filters and the associated dielectric reflective coatings.

FIG. 8 shows the optimized transmission of the first optical filter stage 13, required for "TRUE" solar blind operation, using a plurality of each of the interference filters 21, the HOYA U330 color glass filters 23 and the associated dielectric reflective coatings 25.

Figure 9:
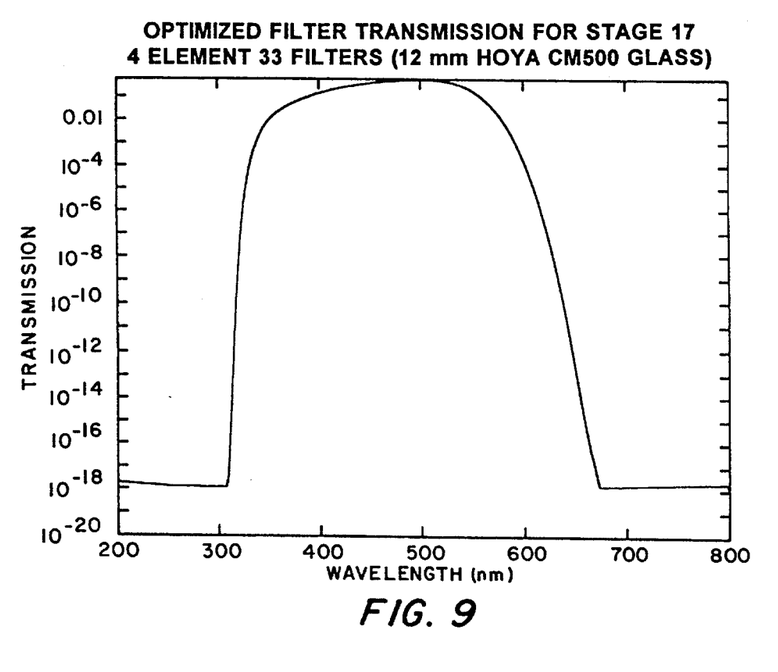
FIG. 9 shows the optimized transmission of Stage 2 using four 3 mm thick CM500 filters or 12 mm of CM500 glass.

FIG. 9 shows the optimized transmission of the second optical filter stage 17 using four 3 mm thick CM500 filters or 12 mm of CM500 glass.

Figure 10:
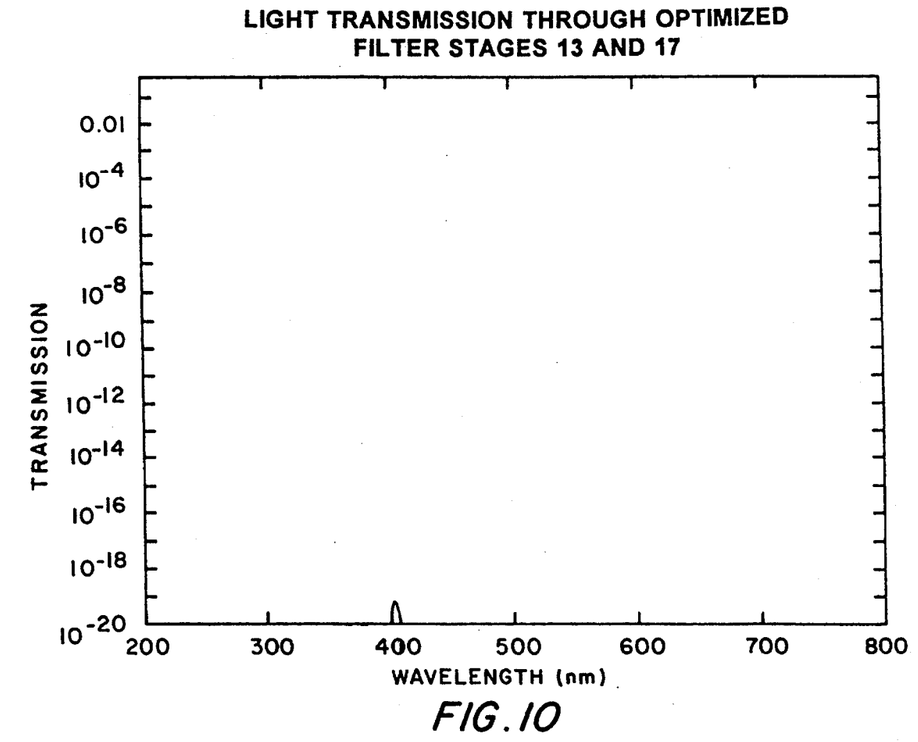
FIG. 10 shows the total light transmission through the optimized stages 1 and 2, with virtually no light passing through the Stage 1 and Stage 2 filter combination.

FIG. 10 shows the total light transmission through the optimized first and second optical filter stages 13 and 17, with virtually no light passing through the stage 13 and stage 17 filter combination.

The Solor-Blind Radiation Detector of the Invention provides the following Unique Features:

1. It utilizes a combination of dielectric reflective and transmissive coatings in combination with absorbing glasses to achieve an extremely sharp transmission cut off between 275 and 285 nm and a broad range of blocked wavelengths between 285 nm and 650 nm. An extinction of $10^{18}$ is required (as indicated in U.S. Pat. No. 5,021,668, without any teaching as to how this requirement is met) and is accomplished using a plurality of filter elements. Virtually no photons with wavelengths longer than 285 nm can be detected.
2. Each of the filter elements can be used as a plurality of elements in any combunation that is required for a given set of measurement conditions.
3. An optically transparent phosphor glass is used as the optical frequency downconverter 15. This allows for efficient absorption of UV photons and good transmission of downconverted photons. The phosphor glass can be directly coated with dielectric films to enhance light rejection and light collection efficiencies.

Therefore, what has been described in a preferred embodiment of the invention is a solar-blind radiation detector apparatus which utilizes a combination of band-pass and band-reject filters, in conjunction with an ultraviolet absorbing, frequency downconverter and a visible-light-sensitive photomultiplier tube to detect ultraviolet signals at wavelengths below 285 nm in the presence of solar illumination.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. An apparatus for detecting an ultraviolet signal in the presence of background solar radiation, said apparatus comprising:

first filter means disposed along an optical axis being responsive to a light flux consisting of background solar radiation and an ultraviolet signal for passing therethrough ultraviolet light wavelengths below a selected ultraviolet wavelength and having a very sharp wavelength cutoff to substantially block wavelengths within a first selected wavelength band above the first selected ultraviolet wavelength;

second and third filter means serially disposed along the optical axis and tilted off the optical axis with respect to each other, said second and third filter means being responsive to light from said first filter means for sequentially passing therethrough ultraviolet light wavelengths below the selected ultraviolet wavelength and substantially blocking visible light within the first selected wavelength band;

means responsive to ultraviolet signal light at wavelengths below the selected ultraviolet wavelength for transforming that light to visible light in a second selected wavelength band;

first dielectric coating means disposed adjacent to said transforming means and between said third filter means and said transforming means for passing the ultraviolet signal light into said transforming means and for reflecting the visible light produced by said transforming means;

fourth filter means responsive to light from said transforming means for blocking all wavelengths greater than about 700 nm that may have passed through said first filter means, and said second and third filter means, and for passing therethrough the visible light in the second selected wavelength band; and means for detecting the visible light in the second selected wavelength band.

2. The apparatus of claim 1 wherein each of said second and third means includes:

an associated first color glass filter for transmitting UV wavelengths and absorbing wavelengths within the second selected wavelength band; and a second dielectric coating means disposed adjacent to an input surface of said associated color glass filter for transmitting therethrough ultraviolet light wavelengths below the selected ultraviolet wavelength and for reflecting visible light wavelengths within a third selected wavelength band below the second selected wavelength band.

3. The apparatus of claim 2 wherein:

said first filter means is an interference filter.

4. The apparatus of claim 2 wherein:

said first filter means is an interference filter;

said second dielectric coating means is a multi-layer dielectric reflective coating;

said transforming means comprises an optical frequency downconverter;

said first dielectric coating means is a multi-layer dielectric coating;

said fourth filter means is a second color glass filter; and said detecting means is a photomultiplier tube.

5. The apparatus of claim 4 wherein:

said selected ultraviolet wavelength is about 285 nm;

said first selected wavelength band is between about 285 nm and about 350 nm;

said second selected wavelength band is between about 450 nm and about 650 nm; and said third selected wavelength band is between about 320 nm and about 380 nm.

6. The apparatus of claim 1 wherein:

said transforming means comprises an optical frequency downconverter.

7. The apparatus of claim 6 wherein:
said optical frequency downconverter is comprised of a sodium salicylate phosphor.

8. The apparatus of claim 6 wherein:
said optical frequency downconverter comprises an optically transparent phosphor glass.

9. The apparatus of claim 8 wherein:
said optically transparent phosphor glass contains a nanocrystalline semiconductor activated with a metal ion.

10. The apparatus of claim 1 wherein:
said first filter means is an interference filter.

11. The apparatus of claim 1 wherein:
said detecting means is a photomultiplier tube for detecting the visible light indicative of the reception of an ultraviolet signal.

12. An apparatus for detecting an ultraviolet signal in the presence of background solar radiation, said apparatus comprising:

first filter means responsive to a light flux consisting of background solar radiation and an ultraviolet signal for passing therethrough ultraviolet light wavelengths below a first selected ultraviolet wavelength and having a very sharp wavelength cutoff to substantially block wavelengths within a first selected wavelength band above the first selected ultraviolet wavelength;

second filter means responsive to light from said first filter means for passing therethrough ultraviolet light wavelengths below the first selected ultraviolet wavelength and substantially blocking visible light within a first selected visible wavelength band;

dielectric reflective coating means disposed adjacent to said second filter means and between said first and second filter means for transmitting therethrough ultraviolet light wavelengths below the first selected ultraviolet wavelength and for reflecting visible light wavelengths within a second selected visible wavelength band;

means responsive to ultraviolet signal light at wavelengths less than the first preselected wavelength for transforming that light to visible light in a third selected wavelength band;

dielectric coating means disposed adjacent to said transforming means and between said second filter means and said transforming means for passing the ultraviolet signal light into said transforming means and for reflecting the visible light produced by said transforming means;

third filter means responsive to light from said transforming means for blocking all wavelengths greater than about 700 nm that may have passed through said first filter means, said dielectric reflective coating means and said second filter means, and for passing therethrough the visible light in the third selected wavelength band; and means for detecting the visible light in the third selected wavelength band.

13. The apparatus of claim 12 wherein:
said transforming means comprises an optical frequency downconverter.

14. The apparatus of claim 13 wherein:
said optical frequency downconverter is comprised of sodium salicylate phosphor.

15. The apparatus of claim 13 wherein:
said optical frequency downconverter comprises an optically transparent phosphor glass.

16. An apparatus for detecting an ultraviolet signal in the presence of background solar radiation, said apparatus comprising:

first filter means responsive to a light flux consisting of background solar radiation and an ultraviolet signal for passing light wavelengths below about 280 nm therethrough and substantially blocking wavelengths between about 285 nm and 350 nm;

second filter means responsive to light from said first filter means for passing ultraviolet wavelengths of light therethrough and substantially blocking visible light between about 420 nm and about 650 nm;

dielectric reflective coating means disposed adjacent to said second filter means and between said first and second filter means for transmitting therethrough light wavelengths below about 290 nm and for reflecting wavelengths between about 340 nm and about 380 nm;

means responsive to ultraviolet signal light at wavelengths less than about 275 nm for transforming that light to visible light in a wavelength band between about 450 nm and about 650 nm;

dielectric coating means disposed adjacent to said transforming means and between said second filter means and said transforming means for passing the ultraviolet signal light into said transforming means and for reflecting the visible light produced by said transforming means;

third filter means responsive to light from said transforming means for blocking all wavelengths greater than about 700 nm that may have passed through said first filter means, said dielectric reflective coating means and said second filter means, and for passing therethrough the visible light in the wavelength band between about 450 nm and about 650 nm; and means for detecting the visible light in the wavelength band between about 450 nm and about 650 nm.

17. The apparatus of claim 16 wherein:
said first filter means comprises a dielectric coated interference filter which has a light transmission of less than 0.5% over the wavelength range between about 285 nm and about 350 nm;

said second filter means comprises a first color glass filter;

said dielectric reflective coating means comprises a multi-layer dielectric reflective coating deposited on an input surface of said first color glass filter for reflecting wavelengths between about 340 nm and about 380 nm with a reflectivity greater than 99%;

said transforming means comprises an ultraviolet light-absorbing, frequency downconverter for absorbing ultraviolet light at wavelengths less than about 275 nm and transforming that light to visible light in a wavelength band between about 450 nm and about 650 nm;

said dielectric coating means comprises a multi-layer dielectric coating on an input surface of said transforming means for reflecting away any residual incident visible light applied thereto and for reflecting the transformed visible light generated by said transforming means toward said detecting means;

said third filter means is a second color glass filter for blocking all wavelengths greater than about 700 nm that may have passed through said dielectric coated interference filter, said multi-layer dielectric reflective coating and said first color glass filter, and for passing therethrough the visible light in the wavelength band between about 450 nm and about 650 nm; and said detecting means comprises a visible-light-sensitive photomultiplier tube for detecting the visible light generated by said frequency downconverter.

18. The apparatus of claim 17 wherein:

said frequency downconverter is comprised of sodium salicylate phosphor.

19. The apparatus of claim 17 wherein:

said optical frequency downconverter comprises an optically transparent phosphor glass.

20. An apparatus for detecting an ultraviolet light signal in the presence of background solar radiation, said apparatus comprising:

a first filter stage for passing an ultraviolet light signal below about 275 nm and blocking wavelengths in the background solar radiation between about 275 nm and about 700 nm;

an optical frequency downconverter coupled to said first filter stage for transforming the ultraviolet light signal below about 275 nm to visible light at wavelengths between about 400 nm and about 650 nm;

a second filter stage for transmitting therethrough said visible light at wavelengths between about 400 nm and about 650 nm and for blocking wavelengths below about 400 nm and longer than about 650 nm; and detection means for detecting the visible light produced by said downconverter.

21. The apparatus of claim 20 wherein:

said optical frequency downconverter is comprised of sodium salicylate phosphor.

22. The apparatus of claim 20 wherein:

said optical frequency downconverter comprises an optically transparent phosphor glass.

23. An apparatus for detecting an ultraviolet signal in the presence of background solar radiation, said apparatus comprising:

first filter means responsive to a light flux consisting of background solar radiation and an ultraviolet signal for passing therethrough ultraviolet light wavelengths below a first selected ultraviolet wavelength and substantially blocking visible light within a first selected visible wavelength band;

means responsive to ultraviolet signal light at wavelengths less than the first selected ultraviolet wavelength for transforming that light to visible light in a second selected visible wavelength band;

dielectric coating means disposed adjacent to said transforming means and between said first filter means and said transforming means for passing the ultraviolet signal light into said transforming means and for reflecting the visible light produced by said transforming means;

second filter means responsive to light from said transforming means for blocking all wavelengths greater than about 700 nm that may have passed through said first filter means, and for passing therethrough the visible light in the second selected visible wavelength band; and means for detecting the visible light in the second selected wavelength band.

* * * * *